United States Patent
Yamada et al.

(10) Patent No.: US 9,533,224 B2
(45) Date of Patent: Jan. 3, 2017

(54) GAME PROGRAM AND GAME APPARATUS FOR CORRECTING PLAYER'S ROUTE WITHIN A GAME SPACE

(75) Inventors: Yoichi Yamada, Kyoto (JP); Daiki Iwamoto, Kyoto (JP); Shirou Mouri, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 363 days.

(21) Appl. No.: 12/563,359

(22) Filed: Sep. 21, 2009

(65) Prior Publication Data

US 2010/0304871 A1    Dec. 2, 2010

(30) Foreign Application Priority Data

May 29, 2009  (JP) ................................ 2009-129825

(51) Int. Cl.
 A63F 9/24   (2006.01)
 A63F 13/426  (2014.01)
 A63F 13/2145 (2014.01)
 A63F 13/525  (2014.01)
 A63F 13/92   (2014.01)

(52) U.S. Cl.
 CPC ......... *A63F 13/426* (2014.09); *A63F 13/2145* (2014.09); *A63F 13/525* (2014.09); *A63F 13/92* (2014.09); *A63F 2300/204* (2013.01); *A63F 2300/301* (2013.01); *A63F 2300/643* (2013.01); *A63F 2300/646* (2013.01); *A63F 2300/6684* (2013.01)

(58) Field of Classification Search
 USPC ................. 463/30–32, 36–37; 345/173–174, 345/473–475
 See application file for complete search history.

(56) References Cited

U.S. PATENT DOCUMENTS

| | | | | |
|---|---|---|---|---|
| 6,067,096 A  * | 5/2000 | Nagle | ........................... | 345/473 |
| 6,252,563 B1 * | 6/2001 | Tada et al. | ..................... | 345/1.1 |
| 6,344,861 B1 * | 2/2002 | Naughton et al. | ............ | 715/769 |
| 6,545,669 B1 * | 4/2003 | Kinawi et al. | ................ | 345/173 |
| 6,949,024 B2 | 9/2005 | Kaku et al. | | |
| 7,445,549 B1 * | 11/2008 | Best | ............................... | 463/32 |

(Continued)

FOREIGN PATENT DOCUMENTS

| | | |
|---|---|---|
| JP | 10-031552 | 2/1998 |
| JP | 11-306391 | 11/1999 |

(Continued)

OTHER PUBLICATIONS

Andy Dunn, 2D Game Primer (Visual C#), Feb. 20, 2007, http://channel9.msdn.com/coding4fun/articles/2D-Game-Primer-Visual-C.*

(Continued)

*Primary Examiner* — Jason Yen
(74) *Attorney, Agent, or Firm* — Nixon & Vanderhye, P.C.

(57) ABSTRACT

A game apparatus displays game space on a display means, and the game space includes a first area and a second area which interrupts continuity of a movement of an object in the first area. A user sets a moving route within the game space by means of a touch pen. The collision, that is, the object moves along the route. Assuming that the object moves to a next point position on the route, when the next point position where the object will enter the second area is set, the computer corrects the next point position to a target position within the first area, and then moves the object thereto.

13 Claims, 9 Drawing Sheets

(56) References Cited

U.S. PATENT DOCUMENTS

| | | | |
|---|---|---|---|
| 7,833,096 B2* | 11/2010 | Sakaguchi et al. | 463/31 |
| 2002/0013172 A1* | 1/2002 | Kaku et al. | 463/32 |
| 2004/0229691 A1* | 11/2004 | Kawai et al. | 463/31 |
| 2005/0197186 A1* | 9/2005 | Ohta | 463/30 |
| 2005/0202869 A1* | 9/2005 | Miyamoto et al. | 463/36 |
| 2005/0215323 A1* | 9/2005 | Miyamoto et al. | 463/43 |
| 2006/0094502 A1* | 5/2006 | Katayama et al. | 463/31 |
| 2006/0258455 A1* | 11/2006 | Kando | 463/36 |
| 2006/0267955 A1 | 11/2006 | Hino | |
| 2006/0281546 A1* | 12/2006 | Iwamoto et al. | 463/32 |
| 2006/0281549 A1* | 12/2006 | Iwamoto et al. | 463/37 |
| 2007/0010325 A1* | 1/2007 | Suzuki et al. | 463/31 |
| 2007/0018968 A1* | 1/2007 | Iwamoto et al. | 345/173 |
| 2007/0265081 A1* | 11/2007 | Shimura et al. | 463/37 |
| 2007/0270215 A1* | 11/2007 | Miyamoto et al. | 463/32 |
| 2008/0026843 A1* | 1/2008 | Nakasaka | 463/37 |
| 2008/0114538 A1* | 5/2008 | Lindroos | 701/208 |
| 2008/0125220 A1* | 5/2008 | Sakaguchi | 463/32 |
| 2008/0146328 A1* | 6/2008 | Ishii et al. | 463/31 |
| 2009/0104990 A1* | 4/2009 | Tsujino et al. | 463/32 |
| 2009/0176571 A1* | 7/2009 | Sternberg | 463/36 |
| 2009/0253505 A1* | 10/2009 | Ogawa et al. | 463/31 |
| 2010/0041474 A1* | 2/2010 | Yamamoto et al. | 463/30 |
| 2010/0063788 A1* | 3/2010 | Brown et al. | 703/6 |
| 2011/0039620 A1* | 2/2011 | Hashimoto | 463/36 |

FOREIGN PATENT DOCUMENTS

| | | |
|---|---|---|
| JP | 2003-067780 | 3/2003 |
| JP | 2006-024236 | 1/2006 |
| JP | 2006-318392 | 11/2006 |
| JP | 2007-026129 | 2/2007 |
| JP | 2007-072915 | 3/2007 |
| JP | 2007-244740 | 9/2007 |
| JP | 2009-022553 | 2/2009 |

OTHER PUBLICATIONS

Kasper Fauerby, Collision detection & Response, Jul. 21, 2003, http://www.peroxide.dk/download/tutorials/tut10/pxdtut10.html.*

Amanda Kondolojy, Dragon Ball: Origins Review, Jan. 24, 2009, http://cheatcc.com/ds/rev/dragonballoriginsreview.html.*

Sonic Chronicles The Dark Brotherhood Instruction Booklet, SEGA, 2006.*

"The Legend of Zelda: Phantom Hourglass" product instructions, Nintendo Co. Ltd., Jun. 23, 2007, 40 pages.

"The Legend of Zelda", http://www.nintendo.co.jp/ds/azej/penaction/03.html (URL for introducing the the game identified in document A), 1 page.

* cited by examiner

FIG. 7

ROUTE DATA

| COORDINATE COUNTER VALUE | TOUCHED COORDINATES (Xa, Ya) |
|---|---|
| 1 | ( X1 , Y1 ) |
| 2 | ( X2 , Y2 ) |
| ⋮ | ⋮ |
| n | ( Xn , Yn ) |

GAME PROGRAM AND GAME APPARATUS FOR CORRECTING PLAYER'S ROUTE WITHIN A GAME SPACE

CROSS REFERENCE OF RELATED APPLICATION

The disclosure of Japanese Patent Application No. 2009-129825 is incorporated herein by reference.

BACKGROUND OF THE INVENTION

Field of the Invention

The present invention relates to a game program and a game apparatus. More specifically, the present invention relates to a game apparatus and a game program therefor for which an object moves along a route designated by a user within a game space including a first area, such as a floor, a ground or the like and a second area where continuity of the movement of the object in the first area is interrupted, such as a wall, another floor or a ground different in height, or a pond (water surface) or the like.

Description of the Related Art

One example of a game of such a kind is known by a non-patent document 1 ("The Legend of Zelda: Phantom Hourglass" product instructions", Nintendo Co. Ltd., Jun. 23, 2007) is known. In the background art, an object like a boomerang shown in a non-patent document 2 (http://www.nintendo.co.jp/ds/azej/penaction/03.html (URL for introducing the non-patent document 1 game)) moves along a trace or route that a user sets within a game space. Here, when the route contacts an obstacle like a wall, the boomerang returns to a player character ("Link") without moving along the route when the boomerang arrives at the contacted position.

However, the non-patent document 2 only introduces that the boomerang can be used, and a movement of returning the boomerang is not actually described.

Depending on the land (geometry) of the game space, in some cases, it is difficult to accurately set a route only within the first area without extending to the second area. For example, in a case of a narrow passage sandwiched between walls, a narrow bridge spanning a river, etc., the user may set the route in the second area, such as the wall, the river as well as on the first area, such as the passage, the bridge, etc. In such a case, in order to move the object as the user intended, the user may have to set the route repetitively under certain circumstances. Or, the user has to set the route within the game space with meticulous care.

SUMMARY OF THE INVENTION

Therefore, it is a primary object of the present invention to provide a novel game program and game apparatus.

Another object of the present invention is to provide a game program and a game apparatus which are capable of less load of setting a moving route on a user.

The present invention employs a following configuration in order to solve the above-described problems. It should be noted that reference numerals and the supplements inside the parentheses show one example of a corresponding relationship with the embodiments described later for easy understanding of the present invention, and do not limit the present invention.

A first invention is a storage medium storing a program so as to be readable by a computer of a game apparatus, the program causes the computer to function as: a display controlling means for displaying on a display a game space including a first area and a second area where continuity of a movement of an object within the first area is interrupted; an object movement controlling means for moving the object along a route that a user designates within the game space; an enter determining means for determining whether or not a predetermined area being associated with the object moving along the route enters the second area over a border between the first area and the second area; and a route correcting means for correcting the route along which the object moves so as to become a route within the first area when the enter determining means determines that the predetermined area enters the second area.

In the first invention, a program causes a computer of a game apparatus (10: a reference numeral corresponding in the "detailed description of the preferred embodiments" described later, and so forth) to function as a display controlling means, an object movement controlling means, an enter determining means, and a route correcting means. The display controlling means corresponds to a screen display controlling program to be executed by using image data by the computer in this embodiment, for example, and displays a game space including a first area, such as a floor or a ground, or the like and a second area, such as a wall, another floor or ground different in height, a pond (water surface) or the like and an object within the game space. The computer sets a route along which the object moves in response to an operation by the user according to a route setting program, for example. The object movement controlling means corresponds to an object controlling program to be executed by the computer in this embodiment, specifically corresponds to the processing in a step S113, and moves the object along the route set within the game space according to an operation by the user.

The enter determining means in this embodiment corresponds to a computer and processing in a step S103 to be executed thereby, and the enter determining means determines whether or not a predetermined area (collision 68 in this embodiment) associated with the object enters the border between the first area and the second area included in the game space. For example, a coordinate (X–r) of the outer edge of the predetermined area and a coordinate (X63) of the border are compared with each other, and it is determined whether or not the former is above the latter.

The route correcting means corresponds to a computer and processing in a step S111 to be executed thereby in this embodiment. The route correcting means corrects the route in the step S111 when the enter determining means determines that the predetermined area enters the second area over the border. Accordingly, even if the object moves along the route by the object movement controlling means, the object never enters the second area.

According to the first invention, even if the user sets the route such that the point position on the route extends to the second area, the route is corrected to be a route within the first area, and therefore, the user is not required to be so sensitive to designate the moving route of the object. Thus, it is possible for the user to enjoy playing the game without discouraging the interest.

A second invention is a storage medium according to the first invention, wherein the object movement controlling means moves the object while sequentially taking a point position on the route as a target, and the enter determining means determines whether or not the predetermined area, in a case that the object moves to a next point position on the route, enters the second area over the border between the first area and the second area.

In the second invention, the object movement controlling means moves the object while sequentially taking a point position on the route as a target. Then, the enter determining means determines whether or not the predetermined area associated with the object, when the object moves to a next point position, enters the second area over the border. For example, the coordinate of the outer edge of the predetermined area and the coordinate of the border are compared with each other, and it is determined whether or not the former is above the latter.

According to the second invention, it is possible to determine whether or not the object enters the second area over the border for each subsequent target position.

A third invention is a storage medium according to the second invention, wherein the route correcting means includes a target position setting means for setting the next point position as a target position when the enter determining means does not determine that the predetermined area enters the second area at the next point position, and correcting the next point position so as to become a target position within the first area when the enter determining means determines that the predetermined area enters the second area in the next point position, and the object movement controlling means moves the object to the target position.

In the third invention, the target position setting means corrects the next point position to set a target position within the first area in the step S111 in this embodiment when the enter determining means determines that the predetermined area enters the second area at the next point position over the border. For example, in view of the size (radius of the collision 68 in this embodiment) of the predetermined area, the target position for which the predetermined area enters the first area and does not enter the second area is set. Here, the target position setting means sets the next point position an the route as a target position in the step 105 in this embodiment when the enter determining means does not determine that the predetermined area enters the second area over the border at the next point position. Accordingly, in either case, even if the object is directly moved to the target position by the object movement controlling means, the object never enters the second area.

According to the third invention, the target position is corrected by the target position setting means when required, and therefore, it is possible to move the object as the user intended and to surely prevent the object from entering the second area.

A fourth invention is a storage medium according to the third invention, wherein the route correcting means includes a judging means for judging whether or not a distance of the next point position from the border is equal to or less than a threshold value when the enter determining means determines that the predetermined area enters the second area over the border in the next point position, and when the judging means judges that the distance is equal to or less than the threshold value, the target position setting means corrects the next point position so as to become a target position within the first area.

In the fourth invention, the distance between the "next point position" and the border is calculated by the computer and processing in a step S107 to be executed thereby, and processing in a step S109 corresponding the judging means judges whether or not the distance is equal to or less than a threshold value. Then, if the distance is equal to or less than the threshold value, the route correcting means does not correct the route. That is, even if the route extends to the second area (64), when the extending amount is small, the target position setting means does not executes the target position setting processing by the correction, but the target position setting processing based on the "next point position".

According to the fourth invention, it is possible to move the object by effectively correcting an unintentional displacement of the route due to a hand shake by the user.

A fifth invention is a storage medium according to the fourth invention, wherein the target position setting means sets the next point position as a target position when the judging means does not judge that the distance is equal to or less than the threshold value.

In this embodiment, even if the enter determining means determines that the outer edge of the predetermined area enters the second area over the border in the next point position, when "NO" is determined in the step S109, the target position setting means (S105) sets the "next point position" as a target position. As in this case, the route designation largely extending to the second area from the first area over the border is interpreted as the route designation that the user dares to intend, and in this case, even at the point position where the object enters the second area, the point position is set as a target position.

Here, in the case of the fifth invention, since the object cannot move to the target position in this embodiment, the movement of the object is suspended as a result.

According to the fifth invention, it is possible to designate the route along which the object moves as the user intended.

A sixth invention is a storage medium according to the fourth invention, wherein a virtual camera representing the game space is a parallel camera, and the threshold value is set to be a different value depending on where the next point position is, at an upper part, a lower part, a left part, or a right part of the game space.

In a case of the game space imaged by the parallel camera (74), at the lower part of the virtual three-dimensional game space, a wall surface (64*a*) as second area is upright while at the upper part thereof, the wall surface (64*b*) is represented to be gently inclined, and the right and left side wall surfaces (64*c*) are represented in an inclination between, the aforementioned wall surfaces. Accordingly, in the sixth invention, depending on how the second area is represented, a different threshold value is set to be used for each upper part, lower part, right side, and left side of the game space.

According to the sixth invention, the threshold value suitable for the representation of the game space is set, freeing the user from uncomfortable feeling.

A seventh invention is a storage medium according to the sixth invention, wherein the threshold value is set to a relatively large value at the upper part, is set to a relatively small value at the lower part, and is set to a value between them at the right or left part.

in the embodiment, since at the upper part of the game space, the object is displayed close to two dimensions in a planar manner, a relatively large threshold value is set, and since at the lower part of the game space, the object is displayed in a complete three-dimensional manner, a relatively small threshold value is set, and at the left and right sides thereof, an intermediate threshold value between the relatively large threshold value and the relatively small threshold value is set.

An eighth invention is a storage medium according to the third invention, wherein the program causes the computer to further function as an attainment determining means for determining whether or not the object arrives at the target position within a predetermined time, and a suspending means for suspending the movement of the object by the object movement controlling means when the attainment determining means does not determine that the object arrives at the target position within the predetermined time.

In the eighth invention, the attainment determining means corresponds to a computer and steps S115-S123 to be executed thereby in this embodiment, and when the object cannot move to the target position within the predetermined time, the object moving processing is suspended. Specifically, in this embodiment, the above-described fifth invention introduces the result of the eighth invention as a result.

A ninth invention is a storage medium according to the first invention, wherein the route correcting means corrects the route along which the object moves such that the object moves along the border within the first area when the enter determining means determines that the predetermined area enters the second area over the border.

According to the ninth invention, the object moves along the border between the first area and the second area, and moves within the first area, freeing the player from uncomfortable feeling.

A tenth invention is a storage medium according to the first invention, wherein the program causes the computer to further function as a first display means for displaying the route on the display, and a second display means for displaying the route corresponding to a position within the game space of the object moved by the moving means out of the route displayed by the first display means in a manner different from the manner of the route displayed by the first display means.

In the tenth invention, a first display means corresponds to a computer and processing in a step S17 to be executed thereby in this embodiment, and displays, when the user properly sets a route, the route. A second display means in this embodiment corresponds to processing in a step S125 to be executed by the computer. The second display means displays the route along which the object has finished to move in a manner different from the first display (change in color, for example).

According to the tenth invention, it is possible to make the user recognize the route along which the object has finished to move out of the route designated by the user.

An eleventh invention is a storage medium according to the first invention, wherein the program causes the computer to further function as a position detecting means for detecting a position within the game space designated by the user, and a route generating means for generating the route on the basis of a position detected until a previous time and a position currently detected when the position currently detected by the position detecting means and the position previously detected are above a predetermined threshold value.

In the eleventh invention, a route generating means is a computer and a route setting program to be executed thereby, for example. More specifically, a distance between the coordinates previously stored as route data and the current coordinates currently detected are calculated, and whether or not the distance between the two coordinate positions is equal to or more than a predetermined threshold value is determined. If the distance is above the threshold value, the current coordinates are set as route data.

In the eleventh invention, by setting the threshold value to a predetermined value capable of removing the change in coordinates due to the hand shake, it is possible to effectively prevent an unintentional route from being set due to a hand sake.

A twelfth invention is a storage medium according to the first invention, wherein the display controlling means displays an associated image being associated with the object together with the object on the display, and the program causes the computer to further function as a route generating means for, in a case that a designation position designated by the user is on the associated image, generating the route on the basis of a designation position designated by the user subsequently to the designation.

In the twelfth invention, the display controlling means displays an object together with a collision associated therewith within the game space. The user sets a route by sequentially designating the position of the collision.

According to the twelfth invention, the generation of the route is started from the designation of the displayed associated image, allowing the user to easily designate the route.

A thirteenth invention is a storage medium according to the twelfth invention, wherein the program causes the computer to further function as a predetermined area setting means for setting the predetermined area with reference to the associated image.

In the thirteenth invention, the collision functions as a predetermined area, for example.

A fourteenth invention is a game apparatus and comprises: a display controller displaying on a display a game space including a first area and a second area where continuity of a movement of an object within the first area is interrupted; an object movement controller moving the object along a route which a user designates within the game space; an enter determiner determining whether or not a predetermined area being associated with the object moving along the route enters the second area over a border between the first area and the second area; and a route corrector correcting the route along which the object moves so as to become a route within the first area when the enter determining means determines that the predetermined area enters the second area.

By the fourteenth invention as well, it is possible to expect a similar advantage to the first invention.

A fifteenth invention is a game controlling method including following steps of: a display controlling step for displaying on a display a game space including a first area and a second area where continuity of a movement of an object within the first area is interrupted; an object movement controlling step for moving the object along a route which a user designates within the game space; an enter determining step for determining whether or not a predetermined area being associated with the object moving along the route enters the second area over a border between the first area and the second area; and a route correcting step for correcting the route along which the object moves so as to become a route within the first area when the enter determining step determines that the predetermined area enters the second area.

According to the fifteenth invention as well, it is possible to expect an advantage similar to the first invention.

According to the present invention, even if the route along which the object enters the second area is set, the object can be moved within the first area, capable of reducing the load on the user in setting the moving route. Accordingly, it is possible to enjoy playing the game.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is an illustrative view showing one example of route data.

DETAILED DESCRIPTION OF THE PREFERRED EMBODIMENTS

Figure 1:
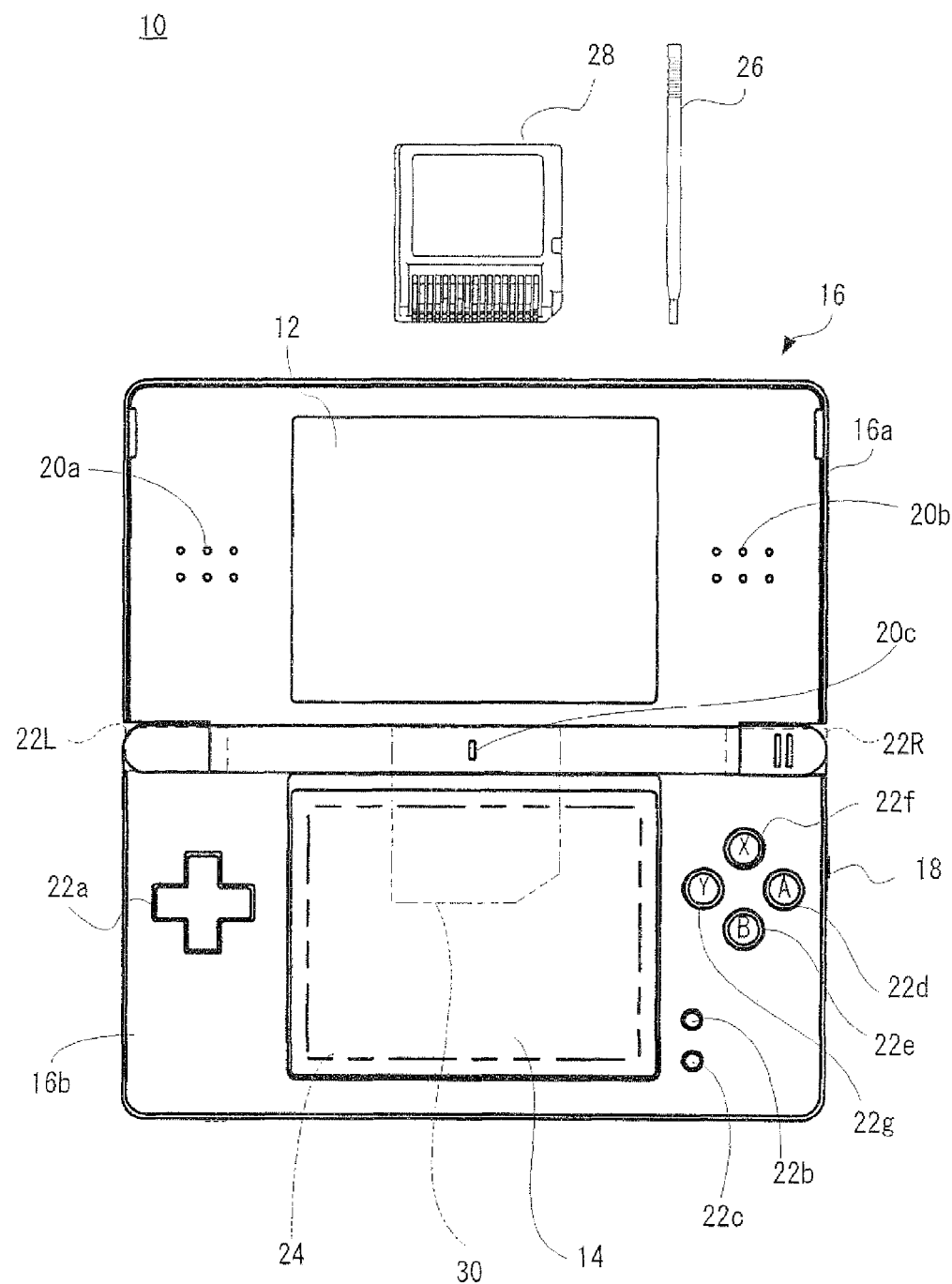
FIG. 1 is an external view showing one example of a game apparatus of one embodiment of the present invention.

Referring to FIG. 1, a game apparatus 10 of one embodiment of the present invention includes a first liquid crystal display (LCD) 12 and a second LCD 14. The LCD 12 and the LCD 14 are set on a housing 16 so as to be arranged in predetermined positions. In this embodiment, the housing 16 is composed of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape being approximately the same as the upper housing 16a, and has an opening formed so as to expose a display surface of the LCD 14 at an approximately center of the horizontal direction. On the right side face of the lower housing 16b, a power switch 18 is provided.

Furthermore, the upper housing 16a is provided with sound release holes 20a and 20b for speakers 36a and 36b (FIG. 2) on both sides of the LCD 12. The lower housing 16b is provided with a microphone hole 20c for a microphone (not illustrated) and operating switches 22 (22a, 22b, 22c, 22d, 22e, 22f, 22g, 22L and 22R).

The upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switch 22 includes the direction instructing switch (cross switch) 22a, the start switch 22b, the select switch 22c, the action switch (A button) 22d, the action switch (B button) 22e, the action switch (X button) 22f, the action switch (Y button) 22g, the action switch (L button) 22L and the action switch (R button) 22R. The switch 22a is arranged at the left of the LCD 14 on one surface of the lower housing 16b. The other switches 22b-22g are arranged at the right of the LCD 14 on the one surface of the lower housing 16b. In addition, the switches 22L and 22R are arranged at the right and left corners on the upper side face of the lower housing 16b, sandwiching the connected portion with the upper housing 16a.

The direction instructing switch 22a functions as a digital joystick, and is utilized for instructing a moving direction of a player character (or player object) to be operated by a user or a player and instructing a moving direction of a cursor, and so forth by operating any one of four depression portions. Also, a specific role can be assigned to each of the four depression portions, and by operating any one of the four depression portions, it is possible to instruct (designate) the assigned role.

The start switch 22b is formed by a push button, and is utilized for starting (restarting), pausing a game, and so forth. The select switch 22c is formed by the push button, and utilized for a game mode selection, etc.

The action switch 22d, that is, the A button is formed by the push button, and allows the player character to perform an arbitrary action, except for instructing the direction, such as hitting (punching), throwing, catching (acquiring), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for changing a game mode selected by the select switch 22c, canceling an action determined by the A button 22d, and so forth.

The action switch 22f, that is, the X button and the action switch 22g, that is, the Y button are formed by the push buttons, and are utilized for a subsidiary operation when the game cannot be advanced only with the A button 22d and the B button 22e. It should be noted that the X button 22f and the Y button 22g can be utilized for the similar operations to the A button 22d and B button 22e. Of course, the X button 22f and the Y button 22g are not necessarily utilized in the game play.

The action switch 22L (left push button) and the action switch 22R (right push button) are formed by push buttons, and the left push button (L button) 22L and the right push button (R button) 22R can be utilized for the similar operations to the A button 22d and B button 22e, and utilized for a subsidiary operation of the A button 22d and B button 22e. Furthermore, the L button 22L and the R button 22R can change the functions assigned to the direction switch 22a, the A button 22d, the B button 22e, the X button 22f, and the Y button 22g to other functions.

Also, on the top surface of the LCD 14, a touch panel 24 is provided. As the touch panel 24, any kinds of a resistance film system, an optical system (infrared rays system) and an electrostatic capacitive coupling system, for example, can be utilized. In response to an operation (touch-on operation) by depressing, stroking, touching, and so forth with a stick 26, a pen (stylus pen), or a finger (hereinafter, referred to as "stick 26 or the like") on the top surface of the touch panel 24, the touch panel 24 detects coordinates of an operated position by the stick 26 or the like to output coordinates data corresponding to the detected coordinates.

Additionally, in this embodiment, a resolution of the display surface of the LCD 14 (the same is true for the LCD 12) is 256 dots×192 dots. A detection accuracy of the touch panel 24 is also rendered 256 dots×192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, a map, characters such as, a player character, etc. are displayed on the one LCD, and items belonging to the player character may be displayed on the other LCD. Additionally, an operation screen (game screen) may be displayed on one LCD (LCD 14 in this embodiment), and another game screen including information relating to the game can be displayed on the other LCD (LCD 12 in this embodiment). Alternatively, by utilizing the two LCD 12 and LCD 14 as one screen, it is possible to display a large monster (enemy character) to be defeated by the player character.

Accordingly, the player is able to designate (operate) an image, such as a player character, an enemy character, an item character, an operating object, etc. to be displayed on the screen of the LCD 14 and select (input) commands by operating the touch panel 24 with the use of the stick 26 or the like. Also, it is possible to change an orientation of a virtual camera (viewpoint) (direction of the line of sight) provided in a three-dimensional game space, and command a scrolling (gradual moving display) direction of the game screen (map).

Additionally, depending on the kind of the game, other input instructions can be made with the use of the touch panel 24. For example, it is possible to input a coordinate input instruction, and input by hand texts, numbers, symbols, etc. to the LCD 14.

Thus, the game apparatus 10 has the LCD 12 and the LCD 14 as a display portion of two screens, and by providing the touch panel 24 on a top surface of any one of them (LCD 14 in this embodiment), the game apparatus 10 has the two screens (12, 14) and the operating portions 22, 24) of two kinds.

In addition, in this embodiment, the stick 26 can be housed in the housing portion (not shown) provided on the lower housing 16*b*, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading slot 30 (shown by dotted lines in FIG. 1) provided on a back face or a lower end (button face) of the lower housing 16*b*. Although omitted in FIG. 1, a connector 32 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and so that, the memory card 28 is accessible by a CPU core 34 (see FIG. 2) of the game apparatus 10.

It should be noted that although not illustrated in FIG. 1, the speakers 36*a* and 36*b* (see FIG. 2) are provided at positions corresponding to the sound release holes 20*a* and 20*b* inside the upper housing 16*a*.

Although omitted in FIG. 1, on the back surface of the lower housing 16*b*, a battery accommodating box is provided, and on the bottom surface of the housing 16*b*, a sound volume switch, an expansion connector and an earphone jack, etc. are provided.

Figure 2:
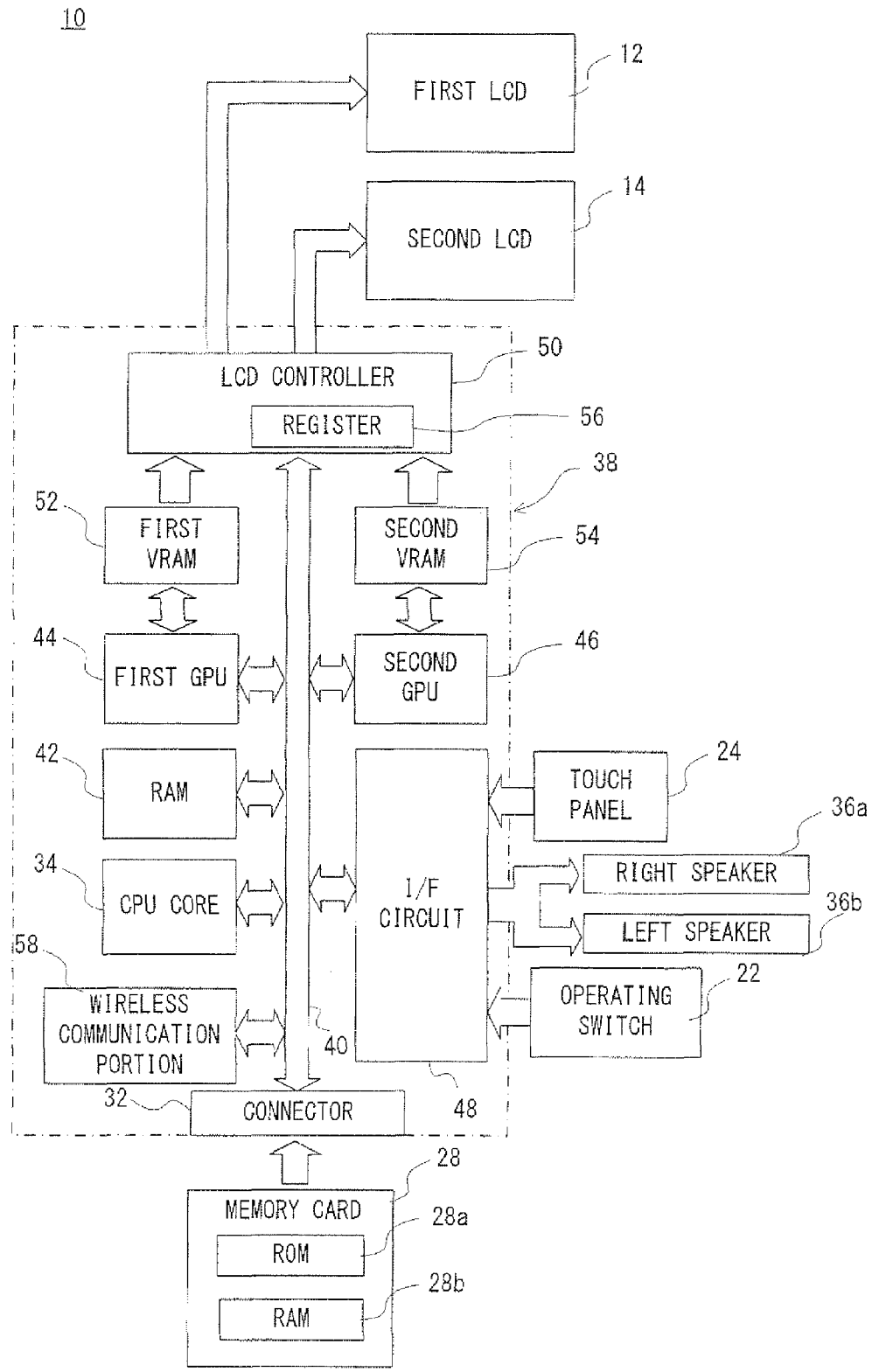
FIG. 2 is a block diagram showing an electric configuration of FIG. 1 embodiment.

FIG. 2 is a block diagram showing an electrical configuration of the game apparatus 10. Referring to FIG. 2, the game apparatus 10 includes an electronic circuit board 38, and on the electronic circuit board 38, circuit components, such as the CPU core 34, etc, are mounted. The CPU core 34 is connected with the above-described connector 32 via a bus 40, and is connected with a RAM 42, a first graphics processing unit (GPU) 44, a second GPU 46, an input-output interface circuit (hereinafter, referred to as "I/F circuit") 48, and an LCD controller 50.

The connector 32 is detachably connected with the memory card 28 as described above. The memory card 28 includes a ROM 28*a* and a RAM 28*b*, and although illustration is omitted, the RUM 28*a* and the RAM 28*b* are connected with each other via a bus, and also connected with a connector (not shown) to be connected with the connector 32. Accordingly, the CPU core 34 gains access to the ROM 28*a* and the RAM 28*b* as described above.

The ROM 28*a* stores in advance a game program for a game to be executed by the game apparatus 10, image data (text and object image, background image, item image, icon (button) image, message image, etc.), data of the sound (music) necessary for the game (sound data), etc. The RAM (backup RAM) 28*b* stores (saves) proceeding data of the game, result data of the game, etc.

The RAM 42 is utilized as a buffer memory or a working memory. That is, the CPU core 34 loads the game program, the image data, the sound data, etc. stored in the ROM 28*a* of the memory card 28 into the RAM 42, and executes the processing according to the loaded game program. The CPU core 34 executes a game processing while storing data (game data, flag data, etc.) temporarily occurring in correspondence with a progress of the game in the RAM 42.

It should be noted that the game program, the image data, the sound data, etc. are stored (loaded) from the ROM 28*a* entirely at a time, or partially and sequentially so as to be stored into the RAM 42.

Each of the CPU 44 and the CPU 46 forms a part of a rendering means, is constructed by, for example, a single chip ASIC, and receives a graphics command (rendering command) from the CPU core 34 to generate image data according to the graphics command. Additionally, the CPU core 34 applies an image generation program (included in the game program) required to generate the image data to both of the CPU 44 and CPU 46 in addition to the graphics command.

Furthermore, the CPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain data (image data: polygon data, texture data, etc.) required to execute the rendering command.

It should be noted that the CPU core 34 writes image data necessary for rendering to the first VRAM 52 and the second VRAM 54 via the GPU 44 and the GPU 46. The GPU 44 accesses the VRAM 52 to create image data for rendering, and the GPU 46 accesses the VRAM 54 to create image data for rendering.

The VRAM 52 and the VRAM 54 are connected to the LCD controller 50. The LCD controller 50 includes a register 56, and the register 56 consists of, for example, one bit, and stores a value of "0" or "1" (data value) according to an instruction of the CPU core 34. The LCD controller 50 outputs the image data created by the CPU 44 to the LCD 12, and outputs the image data created by the GPU 46 to the LCD 14 in a case that the data value of the register 56 is "0". Additionally, the LCD controller 50 outputs the image data created by the GPU 44 to the LCD 14, and outputs the image data created by the GPU 46 to the LCD 12 in a case that the data value of the register 56 is "1".

Here, the LCD controller 50 can directly read the image data from the VRAM 52 and the VRAM 54, or read the image data from the VRAM 52 and the VRAM 54 via the CrPU 44 and the GPU 46.

The I/F circuit 48 is connected with the operating switch 22, the touch panel 24 and the right and left speakers 36a, 36b. Here, the operating switch 22 is the above-described switches 22a, 22b, 22c, 22d, 22e, 22f, 22g, 22L and 22R, and in response to an operation of the operating switch 22, a corresponding operation signal (operation data) is input to the CPU core 34 via the I/F circuit 48. Furthermore, operation data (coordinates data) output from the touch panel 24 is input to the CPU core 34 via the I/F circuit 48. In addition, the CPU core 34 reads from the RAM 42 the sound data necessary for the game, such as a game music (BGM), a sound effect or voices of a game character (onomatopoeic sound), etc., and outputs the same from the speakers 36a, 36b via the I/F circuit 48.

The wireless communication portion 58 is a communication means for transmitting and receiving data with another game apparatus 10 in a wireless manner. That is, the wireless communication portion 58 modulates communication data to be transmitted to the opponent into a wireless signal and transmits it from an antenna. Furthermore, the wireless communication portion 58 receives a wireless signal from the opponent by the antenna to demodulate it to communication data.

In this embodiment, a game in which the user sets a trace (route) along which the object is to be moved within a virtual game world (virtual game space) by means of the touch pen (stick) 26, and moves the object along the route is executed.

Figure 3:
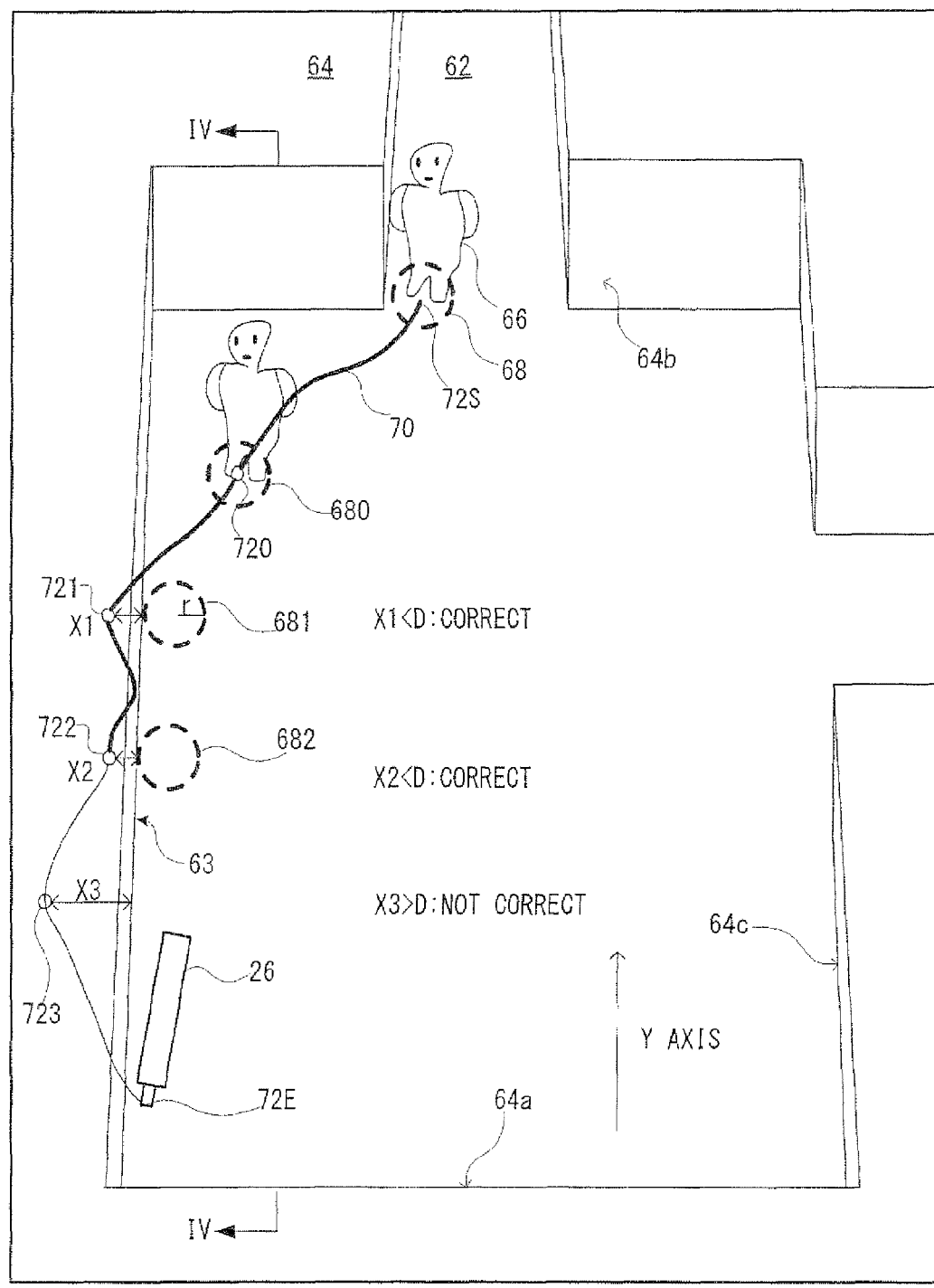
FIG. 3 is an illustrative view showing one example of a game screen including a game space, a route set within the game space, and an object moving along the route within the game space which is displayed on a display means in FIG. 1 embodiment.
Figure 4:
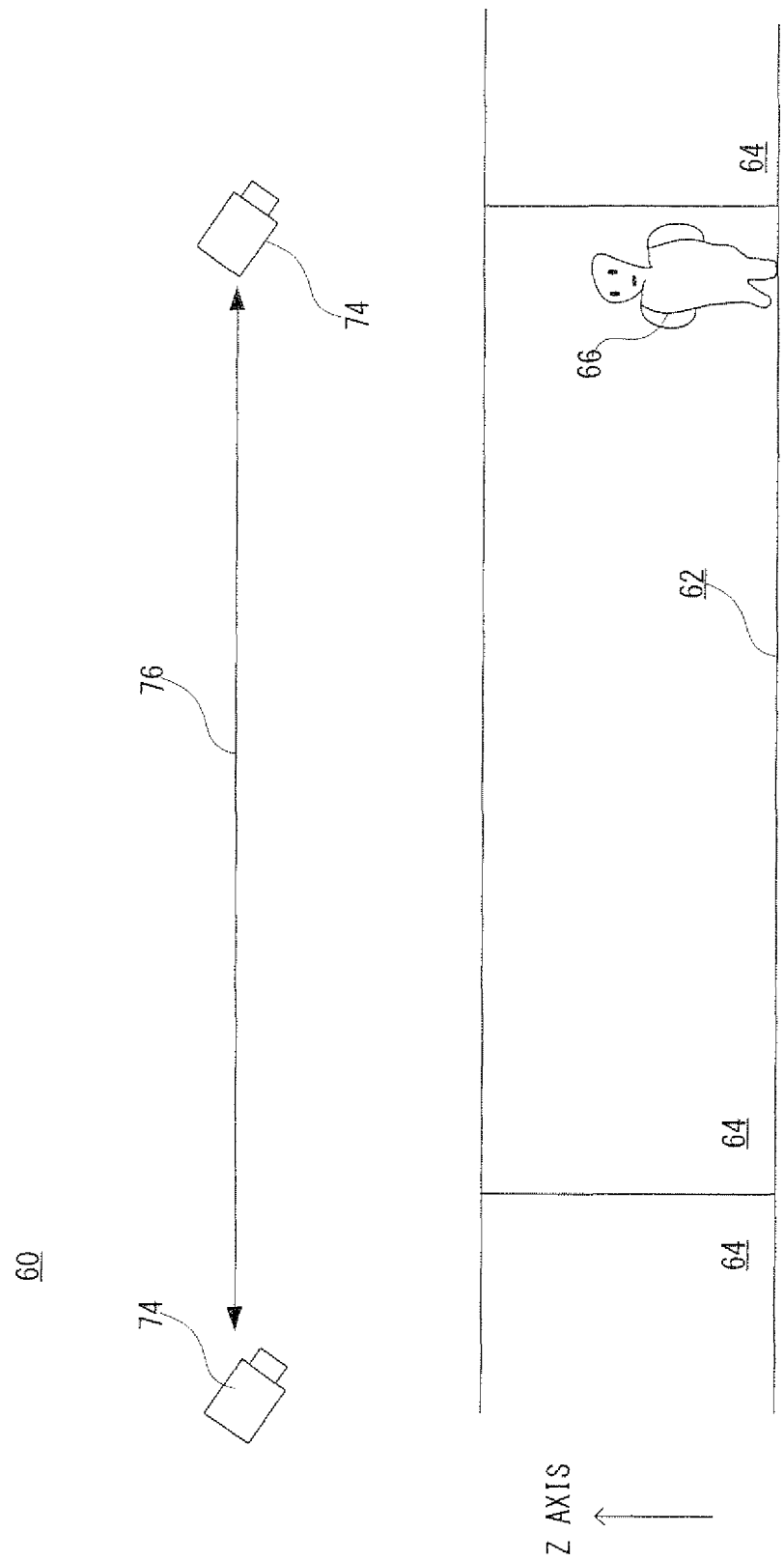
FIG. 4 is an illustrative view showing geometry of the game space in FIG. 3 embodiment.

More specifically, a virtual three-dimensional game screen displaying a virtual three-dimensional game space 60 shown in FIG. 3 is displayed on the second LCD 14. The geometry of the virtual three-dimensional game space 60 shown in FIG. 4 is provided with a first area 62 and a second area 64. The first area 62 is constructed of a floor object, for example, and is an area where the object 66 can freely move so long as the object 66 does not encounter an enemy, etc. The second area 64 is an obstacle, such as a wall object, for example, and an area where a movement of the object 66 within the first area 62 is hindered or interfered. That is, it can be said that the second area 64 is an area having a function of interrupting continuity of the movement of the object within the first area 62. The first area 62 and the second area 64 are in contact with each other via a border 63.

A circle area shown by dotted lines in. FIG. 3, and set beneath the object 66 is an area set in association with the object 66 for determining "collision" (hit or contact), and this area is called a collision 68, here. The collision 68 is a predetermined area being in correlation with the object 66, and in this embodiment, it is determined whether or not the object 66 enters the second area 64 by means of the collision 68, for the sake of convenience as described later.

Then, the user sets a route 70 along which the object 66, that is, the collision 68 is to be moved as shown in FIG. 3 by tracing the surface of the touch panel 24 (FIG. 2) by means of the stick 26.

The route 70 is sequentially set from its starting point 72S to its end point 72E, and, although it is precisely set in reality, formed by successive point positions 72S, 720, 721, 722, 723, . . . 72E.

Then, the collision 68, that is, the object 66 moves along the route 70 in the first area 62 within the game space 60, but the user cannot accurately set a route within only the first area 62 (so as to prevent the object 66 from entering a wall, etc.). For example, if the first area 62 is narrow and small, or if the border 63 between the first area 62 and the second area 64 has a complex shape, the route 70 set by the user often extremely approaches the second area 64, and extends to the second area 64 over the border 63 under certain circumstances. In this case, in the background art referred to before, the movement of the object is suspended, making it difficult for the user to move the object as he or she intended. Thus, in order to move the object as the user intended, the user has to do it over again under certain circumstances, and so long as setting the route is an object of the game to be competed, this may discourage the interest of the user.

Thereupon, in this embodiment, in a case that the object 66 moves along the route 70 that the user designates, even when the object 66 (collision 68) enters the second area 64 more or less, if an extending amount of the route itself designated by the user is an allowable value, the continuity of the route 70 is ensured to make the object 66 continuously move.

That is, although described in detail below, in brief, if the collision 68 which is set to the subsequent point positions enters over the border 63, in a case that the extending amount of the route itself designated by the user over the border 63 is equal to or less than a threshold value D, by determining that the extending amount of the route 70 to the second area 64 at that time is determined to be the enter that the user did not intend, according to the correction of the next point position, the target position to be moved next by the object 66 is set such that the collision 68 is within the first area 62. However, if the collision 68 enters over the border 63, in a case that the extending amount of the route itself designated by the user from the border 63 is above the threshold value D, it is determined that the extending amount of the route 70 to the second area 64 at that time is determined to be the enter that the user intended, and the next point position within the second area 64 is set as a target position to be moved by the object 66 next without no correction.

Additionally, the virtual three-dimensional game space 60 shown in FIG. 3 is a game space imaged by a parallel camera 74 shown in FIG. 4. Here, the parallel camera is a camera moving with its imaging direction constant. In this embodiment, the height position of the camera is also made constant. In the virtual three-dimensional game space 60 represented by such a parallel camera 74, as can be understood from FIG. 3, at the lower part of the virtual three-dimensional game space 60, a wall surface 64a as a second area 64 is upright while the at the upper part thereof, the wall surface 64b is represented to be fallen (gently inclined). Then, the wall surface 64c at the right and left parts has an inclination between the wall surface 64a and the wall surface 64b.

Accordingly, in this embodiment, at the upper part of the virtual three-dimensional game space 60, the object 66 is represented in flag to be fairly close to two dimensions. Thus, even if the route is set to extend to the second area 64 at this position, since the object 66 itself is planar to be close to the two dimensions, if the object 66 enters the second area 64 due to a displacement of the route, the extending amount is not larger in the three-dimensional virtual space than in the two-dimensional looking on the LCD 14, so that a relatively large threshold value is set as a threshold value D of the extending amount of the route over the border 63. On the contrary, at the lower part of the virtual three-dimensional game space 60, the object 66 is represented in a compete three-dimensional manner, so that a relatively small threshold value D is set. At the right and left part of the virtual three-dimensional game space 60, an intermediate value between them is set as a threshold value D.

Figure 5:
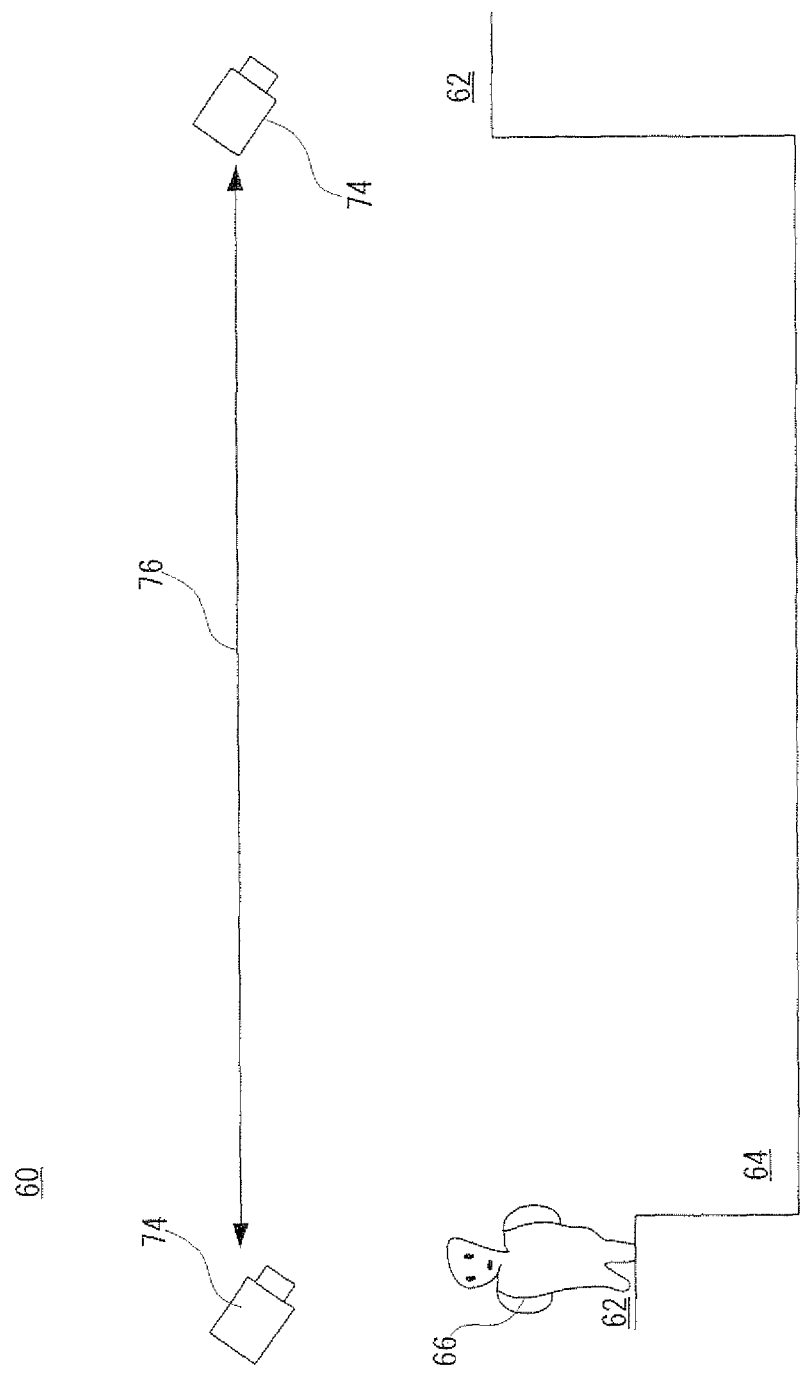
FIG. 5 is an illustrative view showing another example of geometry of the game space to which FIG. 1 embodiment can be applied.

Here, the geometry of the virtual three-dimensional game space in FIG. 3 is shown in FIG. 4. In FIG. 4, the second area 64 is set to a position higher than the first area 62 in the virtual space. However, the second area 64 may be set to a position lower than the first area 62 as shown in FIG. 5. As shown in FIG. 5, as a second area 64 set to a position lower than the first area 62, a water surface (surface different in attribute), such as a pond, a river, the sea, etc., a deep hole, and a floor different in height from the floor of the first area 62 can be assumed. On the water surface, the object 66 cannot move as in the first area 62 (ground, for example), and the object sinks as a result if it does nothing (unless a special state occurs, such as usage of an item). In such a case as well, the second area 64 works so as to interrupt the continuity of the movement of the object 66 in the first area 62.

As shown in FIG. 4 and FIG. 5, it should be noted that the first area 62 and the second area 64 making up of the virtual three-dimensional game space are arranged to take an arbitrary geometry.

In the virtual three-dimensional game space 60 shown in FIG. 3 and FIG. 4, assuming that a horizontal direction in FIG. 3 is taken as an X axis, a vertical direction in FIG. 3 becomes a Y axis, and a height direction shown in FIG. 4 becomes a Z axis. The coordinate of the X axis takes "0" at the left end in FIG. 3, and becomes larger toward the right. The coordinate of the Y axis takes "0" at the lower end in FIG. 3, and becomes larger upward. The coordinate of the Z axis takes "0" at the right end (position of the line representing the first area 62) in FIG. 4, and becomes larger toward the left.

Figure 6:
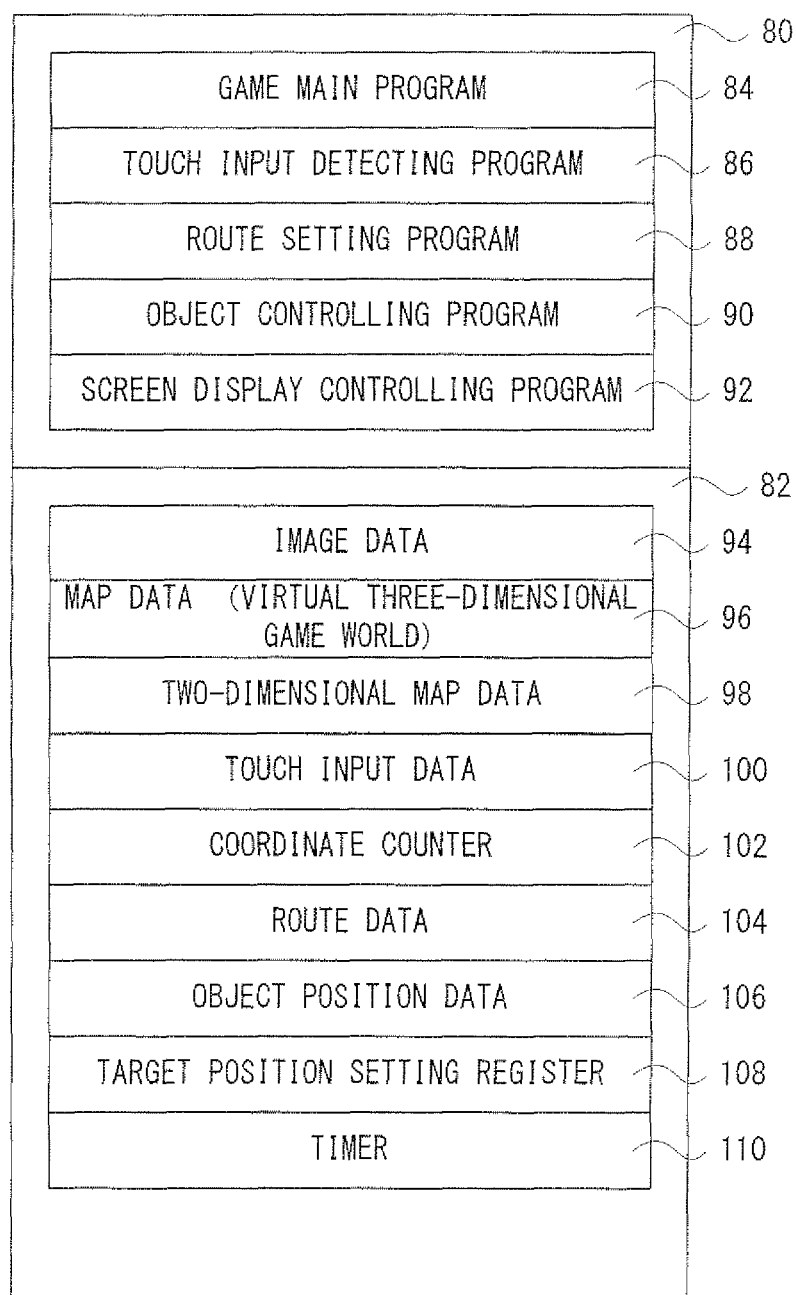
FIG. 6 is an illustrative view showing one example of a memory map of the game apparatus in FIG. 1 embodiment.

FIG. 6 shows one example of a memory map of the game apparatus 10. The memory map includes a program memory area 80 and a data memory area 82. FIG. 6 shows only a part of the memory map, and stores various programs and data necessary for progressing the game and the application.

A game main program memory area 84 stores a program for advancing the game. A touch input detecting program memory area 86 stores a program for detecting operation data (touch input data) from the touch panel 24. The touch input data includes coordinate data of a touched position, and is detected at regular intervals (predetermined number of times per one display frame (1/60 seconds)), for example.

A route setting program. memory area 88 stores a program for acquiring route data representing the route 70 (FIG. 3) along, which the object 66 is moved. In this embodiment, the coordinates successively detected from a touch-on to a touch-off are acquired as route (trace) coordinates. Here, in this embodiment, there is a limit on the length of the trace that the user can draw at a time. More specifically, an upper limit is set to the number of coordinates set as a moving route, and thus, the number of coordinates stored by a coordinate counter (described later) is counted, and if the coordinate counter value is above a predetermined threshold value, the coordinates detected thereafter is not stored as route data. Furthermore, as a way to counter an accidental shake, coordinates which are not far away from the coordinates previously stored above a predetermined distance are not stored as route data as well.

An object controlling program memory area 90 stores a program for controlling a movement of the object 66 along the route 70 set by the user as shown in FIG. 3. By the program, position data indicating the coordinates of the object 66 in the virtual three-dimensional game space, position data indicating the coordinates in a two-dimensional map (described later), etc. are set and updated.

A screen display controlling program memory area 92 stores a program for controlling generation and display of a screen. Furthermore, according to this program, gazing point position data and camera position data for generating a three-dimensional game screen, for example, are set and displayed.

An image data memory area 94 stores image data for representing all the objects 66 or all the characters including a land object, a background object, the object 66, etc.

A map data memory area 96 stores map data in the virtual three-dimensional game world. The map data is data indicating the configuration of the virtual three-dimensional game world, and includes position data and image designating data of the object fixedly set, such as a land object, etc.

A two-dimensional map data memory area 98 stores two-dimensional map data of the virtual three-dimensional game world. This two-dimensional map is a plan view when the virtual three-dimensional game world is seen from the aforementioned virtual camera. The two-dimensional map data is utilized for determining whether or not the route 70 in FIG. 3 extends to the second area 64 as described later in detail, calculating the distance between the "next point position" and the border 63 (FIG. 3) in this case, and setting the corrected target position.

A touch input data memory area 100 stores touch input data detected by the touch input detecting program. The touch input data includes data indicating the presence or absence of a touch input and detected coordinate data.

A coordinate counter memory area 102 stores a variable for counting the number of touched coordinates stored as a route according to the route setting program 88. That is, in this embodiment, there is a limit on the number of coordinates (point positions) which can be stored as a route. That is, in a case that the number of coordinates stored as a route is above a constant value (100, for example), even if a touch-on state is detected, the detected coordinates are not stored as route data. However, the limit value of the number of coordinates is arbitrarily changeable, and moreover, the limit value may not be arbitrarily set. If the limit value is not set, this coordinate counter memory area 102 can also be omitted naturally.

A route data memory area 104 stores route data acquired according to the route setting program. As route data, as shown in FIG. 7, touched coordinates (Xa, Ya) are stored by being correspondence with the coordinate counter value. This touched coordinates are position data of each point (720, 721, 722, . . . in FIG. 3) on the route 70.

Returning to FIG. 6, an object position data memory area 106 stores position data indicating a position coordinate of the object 66 in the virtual three-dimensional game space, a position coordinate on the two-dimensional map, etc.

A target position setting register 108 is a register for setting a position to be moved by the object 66 next as a "target position" each time when the object 66 is moved according to the object controlling program.

In addition, a timer 110 is a timer for determining time out in a case that the object 66 does not move although the computer, that is, the CPU core 34 instructs the object 66 to move to a next point position (target position setting means).

Figure 8:
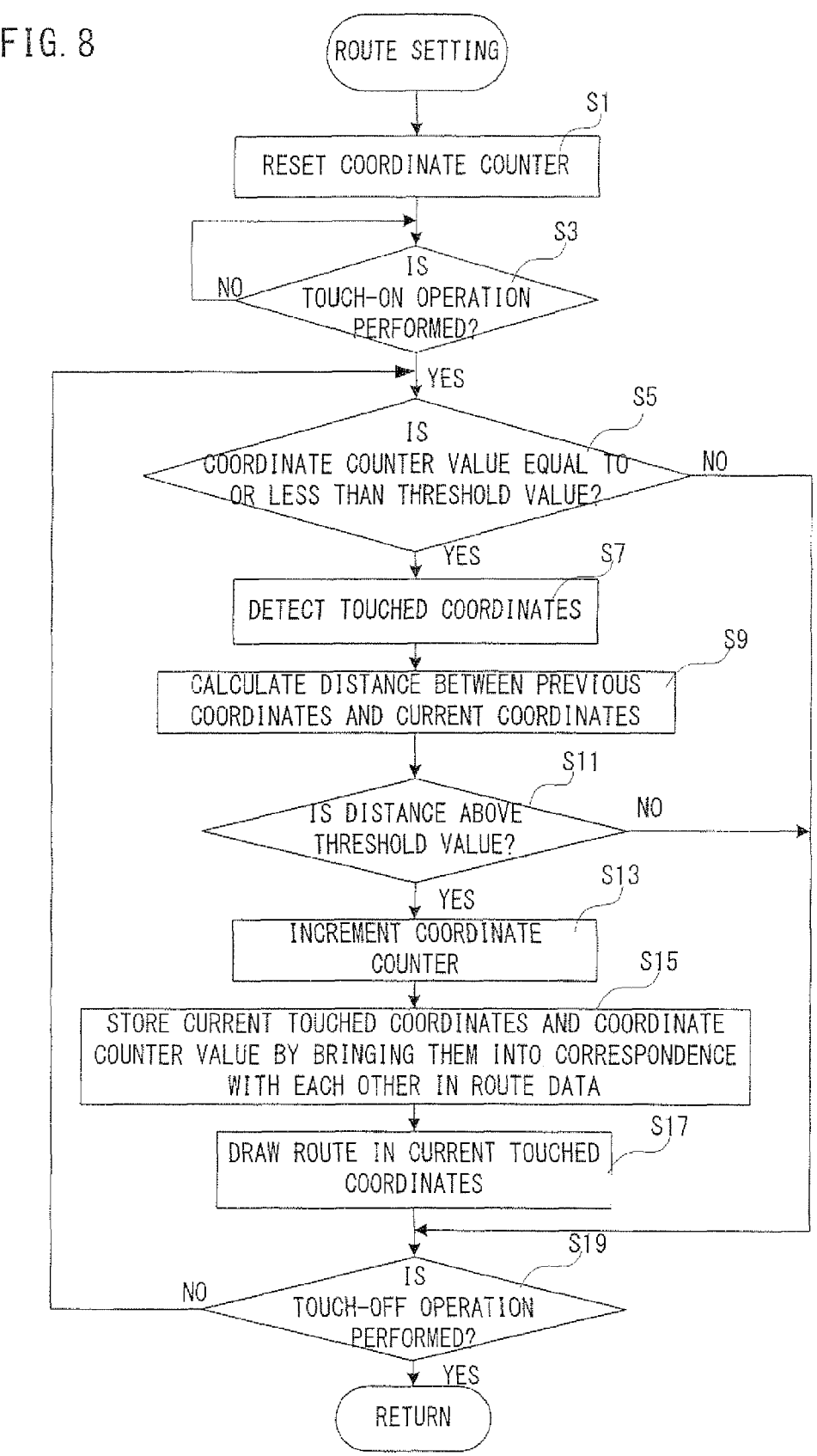
FIG. 8 is a flowchart showing one example of an operation when a route is set by the user in FIG. 1 embodiment.

Here, referring to FIG. 8, an operation of setting route data shown in FIG. 7 according to the moving route setting program 88 is explained.

Here, the computer or the CPU core 34 displays a game image (game screen) representing a virtual three-dimensional game space 60 shown in FIG. 3 by utilizing the image data stored in the image data memory area 94 shown in FIG. 3 and executing the screen display controlling program stored in the screen display controlling program area 92 shown in FIG. 3. That is, the screen display controlling program constructs a display controlling means, and when the display controlling means displays a game screen, an associated image associated with the object 66, that is, an image of the collision 68 in this embodiment is displayed on the display (second LCD 14) together with the object 66 as shown in FIG. 3.

Thereupon, in this embodiment, when the user sets the route 70 of the object 66, the user can set the route 70 by designating the successive point positions along which the above-described collision 68 is to be moved. Accordingly, in a case that a point position designated by the user is placed on the image of the collision 68, the route 70 is generated on the basis of the point position indicated by the designation of the user.

Depending on the game, the object 66 is very large or very small, and in such a case, which position of the object 66 the user has to touch in order to designate a point position for generating the route is difficult for the user to the understand. However, as shown in the embodiment, if touching the associated image (collision 68) of the object 66 determines that the user performs an operation for setting a route, the user can easily understand which position the user first designates when setting the route.

In a first step S1, the computer, that is, the CPU core 34 (FIG. 2) reset a coordinate counter value stored in the coordinate counter memory area 102 shown in FIG. 6.

Then, in a step S3, the CPU core 34 determines whether or not a touch-on operation is performed, that is, whether or not a touch input is started. More specifically, the CPU core 34 determines whether or not a touch input is performed on the basis of the touch input data stored in the touch input data memory area 100. Then, the CPU core 34 determines that a touch input is started when the previous touch input data indicates that an input is not performed, and the current touch input data indicates that an input is performed. If "YES" is determined in the step S3, that is, if a touch input is started, the process proceeds to a step S5. That is, acquiring route data is started. On the other hand, if "NO" is determined in the step S3, the process in the step S3 is executed again.

As described above, at a time of setting a route, the user will perform an route setting operation when the associated image of the object 66, that is, the image of the collision 68 is first touched in this embodiment, and therefore, in the step S3, the CPU core 34 determines "YES" when a point on the image of the collision 68 is touched. Accordingly, when the user touches a point on an image except for the image of the collision 68, it is determined that an operation except for the route setting operation is performed, and "NO" is determined in the step S3.

In the step S5, the computer, that is, the CPU core 34 determines whether or not a coordinate counter value stored in the coordinate counter memory area 102 is equal to or less than a predetermined threshold value. If "YES" is determined in the step S5, that is, if the number of coordinates of the route data is not above an upper limit, the CPU core 34 detects coordinates (touched coordinates) of the touched position from the touch input data in a step S7.

Succeedingly, in a step S9, the CPU core 34 calculates a distance between the touched coordinates previously stored as route data and the current touched coordinates currently detected. Here, by setting the initial value of the previous coordinate at the coordinates away from the coordinates capable of being detected as touched coordinates by a distance above a threshold value, in a case that the coordinate counter value is an initial value, that is, when a touch input is started, a distance above the threshold value is configured to be calculated.

Then, in a step S11, the computer, that is, the CPU core 34 determines whether or not the calculated distance between the two coordinate positions is equal to or more than a predetermined threshold value. This threshold value of the distance is set to a predetermined value capable of removing change in coordinates due to an unintentional movement of the hand. If "YES" is determined in the step S11, that is, if the current touched coordinates currently detected are regarded as route setting coordinates that the user intended, the CPU core 34 increments the coordinate counter to update the coordinate count value in a step S13.

Then, in a step S15, the computer, that is, the CPU core 34 additionally stores in the route data memory area 104 data obtained by bringing the "coordinates of the virtual space corresponding to the current touched coordinates" and the coordinate counter value into correspondence with each other. In this manner, the route data as shown in FIG. 7 is stored. Here, the coordinates of the virtual space stored in the route data memory area 104 may be three-dimensional coordinates. However, in this embodiment, a determination of an entering amount of the collision 68 from the border 63 and a determination of the extending amount of the route designated by the user from the border 63 are performed in a two-dimensional manner, and the coordinates of the virtual space to be stored in the route data memory area 104 are two-dimensional coordinates.

Succeedingly, in a step S17, the computer, that is, the CPU core 34 draws a dot image for representing a trace on the current touched coordinates within the game space on the basis of the image data, the current touched coordinate data, etc. by utilizing the CPU 50, etc. Thus, the route 70 set by the user is drawn on the game screen as shown in FIG. 3, for example.

Here, in FIG. 3 embodiment, the route from a starting point 72S to a point position 722 is drawn in "bold line", and the route after the point position 722 is drawn in "fine line". This is because the route is discriminated depending on whether or not the object 66 actually moves thereon. That is, the route from the starting point 72S to the point position 722 is drawn in bold line as a route on which the object 66 has already moved, and the route thereafter is drawn in fine line as a route on which the object 66 has not moved yet. In reality, by drawing the route with different colors, whether or not the object 66 has already moved is visibly represented.

Thereafter, the process proceeds to the step S17 to make the CPU core 34 determine whether or not a touch-off operation is performed, that is, whether or not the touch input is ended. More specifically, the CPU core 34 determines whether or not the touch input is ended by determining whether or not the touch input data stored in the touch input data memory area 100 indicates that the input is not performed. However, if "NO" is determined in the step S5, or if "NO" is determined in the step S11, the process directly proceeds to the step S17. Then, if "NO" is determined in the step S17, the CPU core 34 returns to the step S5 to repeat the operations from steps S5-S17, and stores a constant number, four coordinate data, here, per display frame (1/60 seconds) as data indicating the point positions on the route as shown in FIG. 7 in the route data memory area 104 shown in FIG. 6.

Thus, after the route 70 on which the object 66 moves is set by the user, the computer, that is, the CPU core 34 executes moving processing for actually moving the object 66 along the route 70 according to the object controlling program 90.

Figure 9:
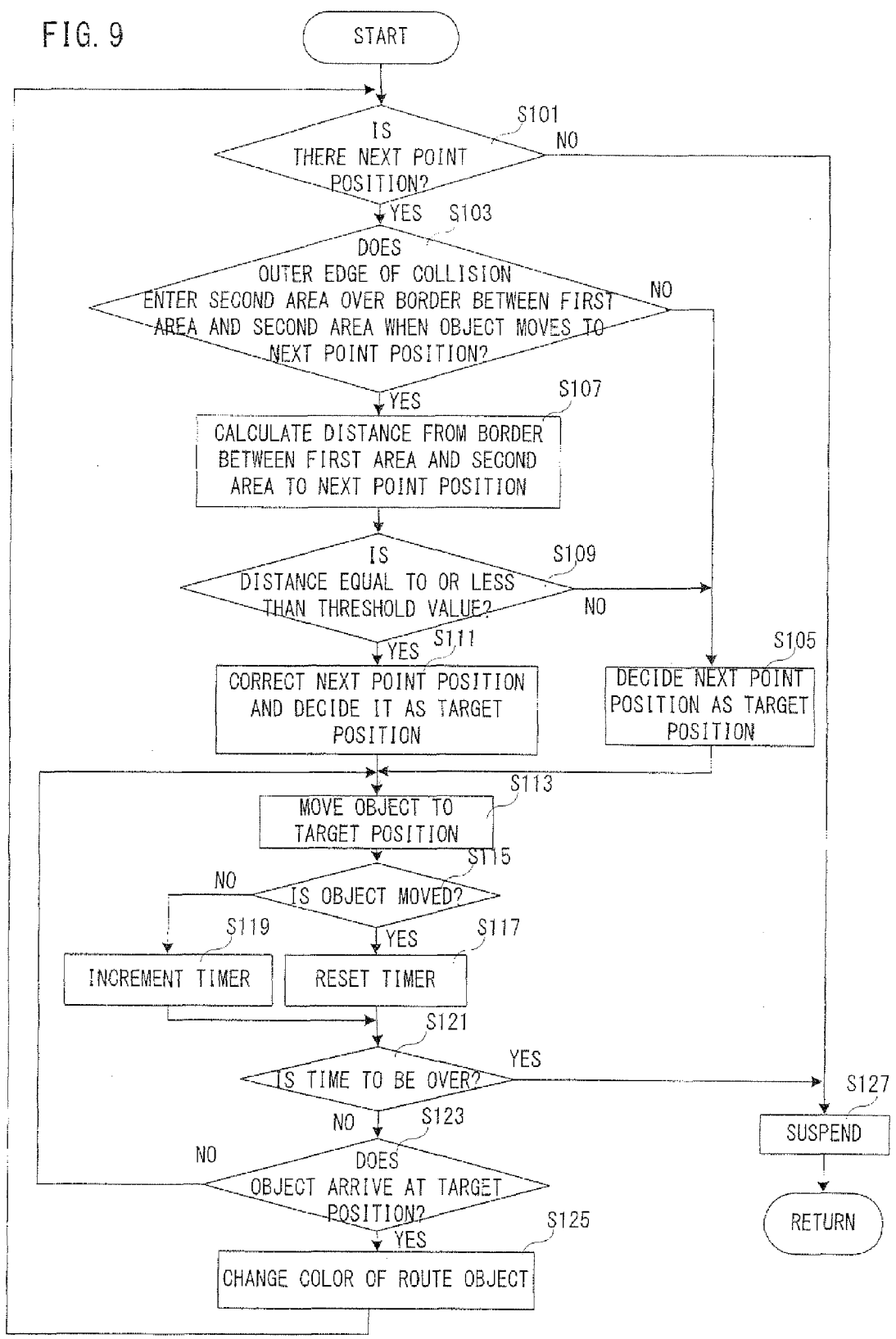
FIG. 9 is a flowchart showing one example of an operation when an object is moved along the route within the game space in FIG. 1 embodiment.

In a first step S101 in FIG. 9, the computer, that is, the CPU core 34 determines whether or not there is a next point position on which the object 66 has not moved yet in the route data memory area 104 in FIG. 6. This can be easily determined by additionally describing a flag indicating whether the object 66 has already moved or has not moved yet in the route data table in FIG. 7. Here, the touched coordinates stored in the route data memory area 104 are utilized according to an order of the coordinate counter value. If there is no next point position to which the object 66 is to be moved, "NO" is determined in the step S101, and the computer, that is, the CPU core 34 executes processing in a step S127 described later.

If there is a next point position to which the object 66 is to be moved, "YES" is determined in the step S101, and the computer, that is, the CPU core 34 executes next processing in a step S103. In the step S103, the CPU core 34 determines whether or not the predetermined area associated with the object 66, that is, the outer edge of the collision 68 (dotted line in FIG. 3) enters to the second area 64 over the border 63 between the first area 62 and the second area 64 when the object 66 moves to the next point position. The step S103 is specifically executed by utilizing the two-dimensional map data 98 in FIG. 6.

That is, when an area for performing an enter determination, that is, a radius of the collision 68 is regarded as "r" as shown in FIG. 3, the radius r is subtracted from the X coordinate value of the next point position, and it is only necessary to determine whether or not the subtracted result "X−r" is larger than an X coordinate value of the border 63 (X63). When (X−r) is larger than X63, even if the object 66 moves to the next point position, the outer edge of the collision 68 never enters the second area 64. Accordingly, "NO" is determined in the step S103, and in this case, the process proceeds to a next step S105 to set the "next point position" as a target position to be moved by the object next in the target position setting register 108.

In a contrary case, that is, if (X−r) is equal to or smaller than X63, this means that when the object 66 moves to the next point position, the outer edge of the collision 68 enters the second area 64 over the border. Accordingly, "YES" is determined in the step S103, and the computer, that is, the CPU core 34 calculates a distance (X63−X) from the border 63 to the next point position in a next step S107.

Then, in a next step S109, the computer, that is, the CPU core 34 determines whether or not the distance between the next point position and the border 63 is equal to or less than the predetermined threshold value. In this embodiment, when the distance from the border 63 to the next point position is small, that is, if the entering amount to the second area 64 is small, such entering is assumed to be made due to a setting that the user did not intend, for example, due to an unintentional movement of the hands, and the next point position is dealt as an effective setting position. Accordingly, in the step S109, it is determined whether or not the entering amount to the second area 64 is an allowable value.

It should be noted that in FIG. 3, an explanation is made on the wall existing in a negative direction of the X axis direction in the game space, but with respect to the wall existing in a positive direction of the X axis direction, when X+r is larger than the X coordinate value of the border 63, it is determined that the collision 68 enters the second area 64, and with respect to the wall existing in a positive or negative direction of the Y axis direction, the content of the processing may be similarly decided as necessary.

Additionally, as described above, as a "threshold value" in the step S109, different threshold values have to be adopted depending on where the next point position is within the game space (upward, downward, left, right), because the game space in this embodiment is a virtual three-dimensional space, but is represented by the parallel camera 74.

If "YES" is determined in the step S109, the computer, that is, the CPU core 34 corrects the "next point position" to decide it as a target position, and stores the same in the target position setting register 108 in a next step S111.

In the setting of the target position in the step S111, in this embodiment, as a collision 681 or 682 in FIG. 3, the target position is set such that the collision 68 moves within the first area 62 along the outer edge of the second area 64. That is, the target position allowing the object 66 to move within the first area 62 along the border 63 is set. For example, when the "next point position" is the point position 721 in FIG. 3, the X coordinate value of the point position 721 is "X63-X1". The X63 is an X coordinate value of the border 63, and the X1 is a distance from the point position 721 to the border 63. Accordingly, in order that the left end of the collision 68 (681) of the radius r is placed at a position along the outer edge of the second area 64, the X coordinate value of the central position of the collision 681 has to be set to "X63+r". That is, in the step S111, the computer, that is, the CPU core 34 corrects the X coordinate value of the position data of the next point position 721 to calculate the coordinate position having the X coordinate value of "X63+r" as a next target position. In this case, the Y coordinate value of the point position 721 (depth direction of the game space in FIG. 3, that is, vertical direction in FIG. 3) is not required to be corrected. This is because that with respect to the position 721, merely replacement of the data in the X direction makes the collision 68, that is, the object 66 move within the first area 62. Accordingly, in the above-described embodiment, the target position is corrected in a direction vertical to the border 63, and in a direction from the second area 64 to the first area 62.

Thus, in the step S111, the point position set on the route 70 is corrected so as to be set as a target position object 66, so that the target position moves to this target position. That is, the next point position is corrected so as to be set as a target position, so that the route along which the object 66 moves is changed. Accordingly, the computer or the CPU core 34 and the step S111 executed thereby make up of a route correcting means.

Here, in the above-described embodiment, the target position for which the object 66 moves along the outer edge of the second area 64 within the first area 62 is set in the step S111. However, the object 66 is only necessary to move within the first area 62, and does not necessarily move along the outer edge (border 63) of the second area 64.

In addition, as a correction method, the target position data is calculated by changing the X coordinate value of the next point position, but a method of changing the Y coordinate value may be adopted in addition thereto. Or, the correcting method by utilizing a tangential vector of the collision is also conceivable. In any case, the target position allowing the object 66 to stay within the first area 62 may be set when the object 66 moves to the next point position.

Alternatively, if "NO" is determined in the step S109, that is, if the entering amount of the next point position to the second area 64 is above the allowable value, such a position setting is determined to be not a position setting due to an intentional movement of the hands, but a position setting as the user intended in this embodiment, and in the step S105, the "next point position" is directly set as a target position. No correction is made similar to when "NO" is determined in the step S103.

After the target position is set in the step S105 or S111, and the timer 110 (FIG. 6) is started, and the computer, that is, the CPU core 34 moves the collision 68, that is, the object 66 to the target position in a next step S113. More specifically, by moving the position data of the object 66 in the object position data memory area 106 to the target position by a constant amount for each display frame, it is possible to gradually move the object 66 to the target position.

In a step S115, the computer, that is, the CPU core 34 determines whether or not the object 66 (collision 68) actually moves to the target position by referring to the target position stored in the target position setting register 108 and the updated position data in the object position data memory area 106.

If "YES" is determined in the step S115, a fact that the object 66 has not arrived is not necessarily determined, and therefore, in a step S117, the timer 110 is reset. On the other hand, if "NO" is determined, a fact that the object 66 has not arrived has to be determined, the timer 110 is incremented in a step S119.

Then, in a step S121, the computer, that is, the CPU core 34 determines whether or not the setting time of the timer 110 (30 frames time, for example) elapses. If "YES" is determined in the step S121, the computer, that is, the CPU core 34 executes processing in a step S127 described later. At this time, the timer 110 is reset. On the other hand, if "NO" is determined in the step S121, the computer, that is, the CPU core 34 determines whether or not the object 66 arrives at the target position by referring to the target position stored in the target position setting register 108 and the updated position data in the object position data area 106 in a following step S123.

If "NO" is determined in the step S123, that is, if the object 66 has not arrived yet at the target position, the computer, that is, the CPU core 34 returns to the preceding step S113 to repeat the processing before the step S123.

If "YES" is determined in the step S123, that is, if it is determined that the object 66 arrives at the target position, the computer, that is, the CPU core 34 draws and changes the color of the route to the target position or the point position (point positions 721, 722 in FIG. 3) as a base of the target position in a next step S125. That is, when "NO" is determined in the step S103, a "next point position" within the first area 62 is set as a target position (step S105), and when "YES" is determined in the step S103, a "next point position" for which at least a part of the collision 68 enters the second area 64 is corrected and set as a target position (step S111), and therefore, in the step S125, the route to the target position or the point position as a base of the target position is drawn so as to be changed in color.

Additionally, when "NO" is deteiniined in the step S109, the computer, that is, the CPU core 34 executes the processing in the next step S105 to set the "next point position" for which at least a part of the collision 68 enters the second area 64 as a target position without correcting it. In this case, the object 66 is not moved to the relevant target position in this embodiment, and therefore, "YES" is consequently determined in the step S121 over a time. Accordingly, in this case, in a step S127, the movement of the object 66 is suspended, and the computer, that is, the CPU core 34 ends the operation processing of the object 66 and returns to the main routine (not illustrated).

When the movement of the object 66 is suspended in the step S127, the color of the route ahead of the position is not changed and remains to be an original color. It remains to be a fine line in FIG. 3.

Additionally, in the above-described embodiment, the collision 68 is used as an "area associated with the object" for determining whether or not the object 66 is to be moved to a next point position, but such a "predetermined area" is not restricted to the collision 68 in this embodiment, and may take a shape of a rectangle and a polygon except for the circle, and may utilize the outline of the object 66 as a predetermined area" as it is.

In the embodiment, a pointing device as a combination of the touch panel 24 and the stick 26 is used for setting a route. However, another pointing device, such as a mouse, etc. may be used. Moreover, by utilizing not the pointing device, but another operating switch, such as a direction input means, like a joystick, a cross key and the A button, for example, a route may be set.

According to the above-described embodiment, even if the user sets a route such that the point position on the route 70 enters the second area 64, the object 66 can move within the first area 62 without moving into the second area 64, and therefore, the user is not required to be so sensitive to the moving route of the object 66, allowing the user to enjoy playing the game without discouraging the interest.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing a program so as to be readable by a computer of a game apparatus, said program causes said computer to perform execution comprising:
    displaying, on a display, a game space including a first area and a second area where continuity of a movement of an object within said first area is interrupted;
    moving said object along a route that a user designates within said game space while sequentially taking a point position on said route as a target;
    determining whether or not a predetermined area associated with said object moving along said route, in a case that said object enters a next point position on said route, enters said second area over a border between said first area and said second area;
    setting said next point position as a target position when said predetermined area does not enter said second area at said next point position;
    judging whether or not a distance of said next point position from said border is equal to or less than a threshold value when said predetermined area enters said second area over said border in said next point position;
correcting said next point position so as to become a target position within said first area when said distance is equal to or less than said threshold value; and
moving said object to said target position.

2. The non-transitory storage medium according to claim 1, said next point position is set as a target position when said distance is not equal to or less than said threshold value.

3. The non-transitory storage medium according to claim 1, wherein a virtual camera representing said game space is a parallel camera, and said threshold value is set to be a different value depending on where said next point position is, at an upper part, a lower part, a left part, or a right part of said game space.

4. The non-transitory storage medium according to claim 3, wherein said threshold value is set to a first value at the upper part, is set to a second value at the lower part, and is set to a value between the first and second values at the right or left part, the second value being smaller than the first value.

5. The non-transitory storage medium according to claim 1, wherein said program causes said computer to further perform execution comprising:
determining whether or not said object arrives at said target position within a predetermined time; and
suspending the movement of said object when said object does not arrive at said target position within the predetermined time.

6. The non-transitory storage medium according to claim 1, wherein the route along which said object moves within said first area is corrected such that said object moves along said border within said first area when said predetermined area enters said second area over said border.

7. The non-transitory storage medium according to claim 1, wherein said program causes said computer to further perform execution comprising:
displaying said route on said display in a first manner; and
displaying said route corresponding to a position within said game space of said moved object in a second manner out of the route displayed in the first manner, said route displayed in the second manner is displayed different from the manner of the route displayed in the first manner.

8. The non-transitory storage medium according to claim 1, wherein said program causes said computer to further perform execution comprising:
detecting a position within said game space designated by the user; and
generating said route on the basis of a position detected until a previous time and a position currently detected when the position currently detected and the position previously detected are above a predetermined threshold value.

9. The non-transitory storage medium according to claim 1, wherein an associated image being associated with said object is displayed together with said object on said display, and
said program causes said computer to further perform execution comprising for, in a case that a designation position designated by the user is on said associated image, generating said route on the basis of a designation position designated by the user subsequently to said designation.

10. The non-transitory storage medium according to claim 9, wherein said program causes said computer to further perform execution comprising setting said predetermined area with reference to said associated image.

11. A game apparatus comprising at least one processor, said processor controlling the game apparatus to perform execution comprising:
display, on a display, a game space including a first area and a second area where continuity of a movement of an object within said first area interrupted;
move said object along a route that a user designates within said game space while sequentially taking a point position on said route as a target;
determine whether or not a predetermined area associated with said object moving along said route, in a case that said object enters a next point position on said route, enters said second area over a border between said first area and said second area;
set said next point position as a target position when said predetermined area does not enter said second area at said next point position;
judge whether or not a distance of said next point position from said border is equal to or less than a threshold value when said predetermined area enters said second area over said border in said next point position;
correct said next point position so as to become a target position within said first area when said distance is equal to or less than said threshold value; and
move said object to said target position.

12. A game controlling method executed by an information processing apparatus having one or more processors, the method comprising:
displaying, on a display, a game space including a first area and a second area where continuity of a movement of an object within said first area is interrupted;
moving said object along a route which a user designates within said game space while sequentially taking a point position on said route as a target;
determining whether or not a predetermined area associated with said object moving along said route, in a case that said object enters a next point position on said route, enters said second area over a border between said first area and said second area;
setting said next point position as a target position when said predetermined area does not enter said second area at said next point position;
judging whether or not a distance of said next point position from said border is equal to or less than a threshold value when said predetermined area enters said second area over said border in said next point position;
correcting said next point position so as to become a target position within said first area when said distance is equal to or less than said threshold value; and
moving said object to said target position.

13. A game system, comprising:
processing circuitry having at least one processor, the processing circuitry configured to:
display, on a display, a game space including a first area and a second area where continuity of a movement of an object within said first area is interrupted;
move said object along a route that a user designates within said game space while sequentially taking a point position on said route as a target
determine whether or not a predetermined area associated with said object moving along said route, in a case that said object enters a next point position on said route, enters said second area over a border between said first area and said second area set said next point position as a target position when said predetermined area does not enter said second area at said next point position;
judge whether or not a distance of said next point position from said border is equal to or less than a threshold value when said predetermined area enters said second area over said border in said next point position;
correct said next point position so as to become a target position within said first area when said distance is equal to or less than said threshold value; and
move said object to said target position.

* * * * *